Jan. 2, 1951     A. DE SAINT-EXUPERY     2,536,728
SYSTEM OF POSITION FINDING BY ELECTROMAGNETIC WAVES
Filed June 4, 1941     3 Sheets—Sheet 1
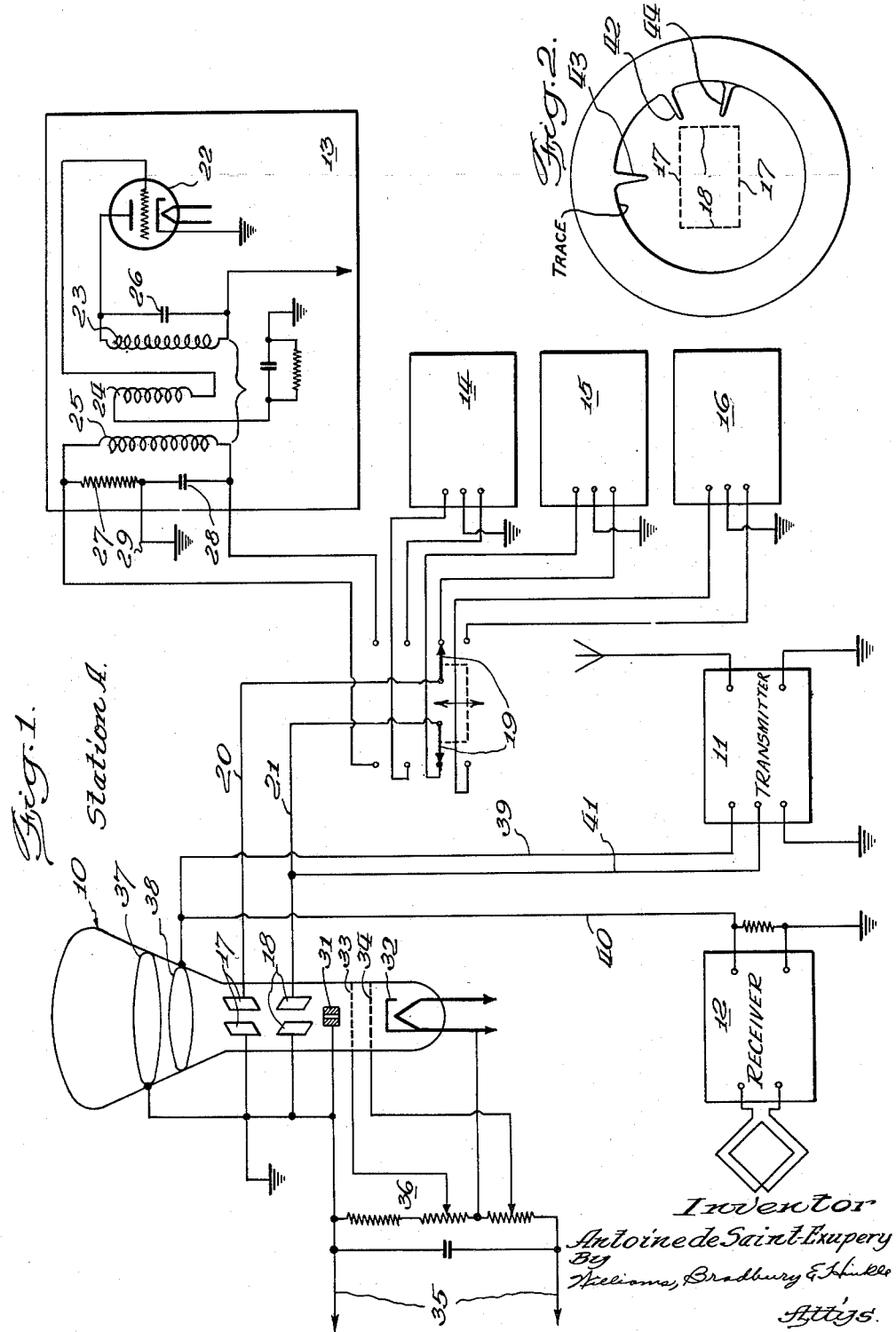
Inventor
Antoine de Saint-Exupery
By
Williams, Bradbury & Hull
Attys.

Jan. 2, 1951     A. DE SAINT-EXUPERY     2,536,728
SYSTEM OF POSITION FINDING BY ELECTROMAGNETIC WAVES
Filed June 4, 1941     3 Sheets—Sheet 2
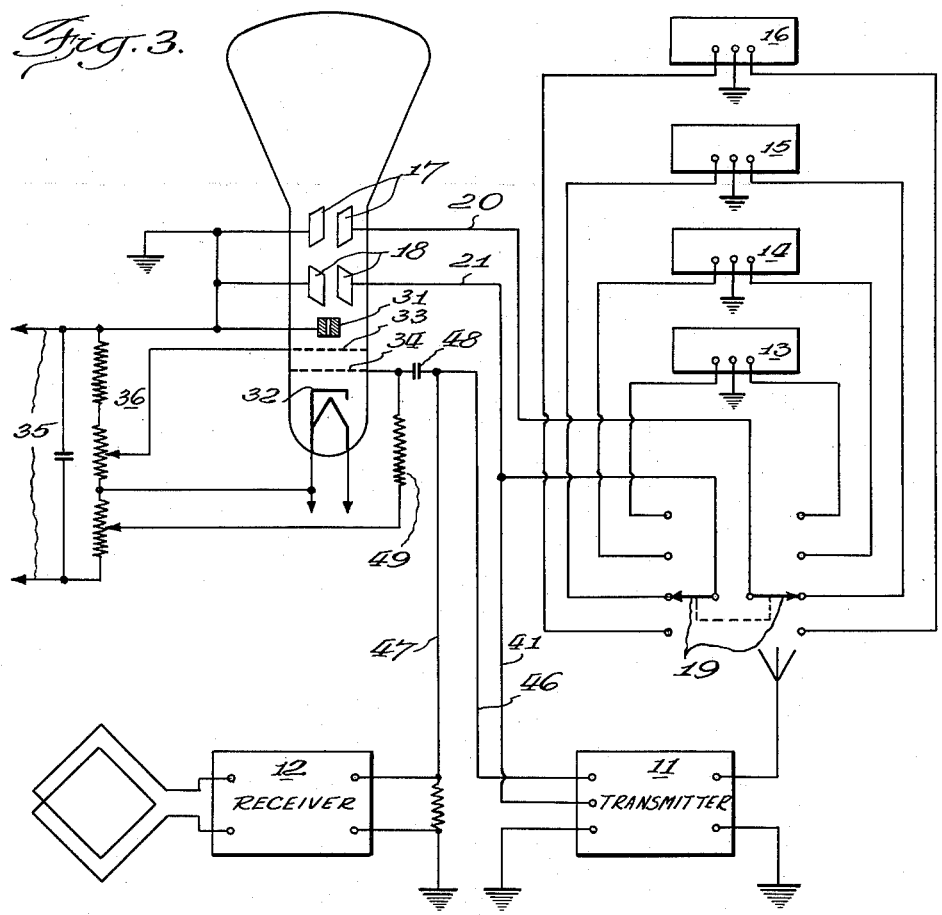
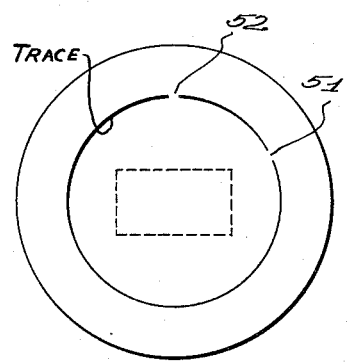
Inventor.
Antoine de Saint-Exupery
By
Williams, Bradbury & Hinkle
Attys.

Jan. 2, 1951  A. DE SAINT-EXUPERY  2,536,728
SYSTEM OF POSITION FINDING BY ELECTROMAGNETIC WAVES
Filed June 4, 1941  3 Sheets-Sheet 3
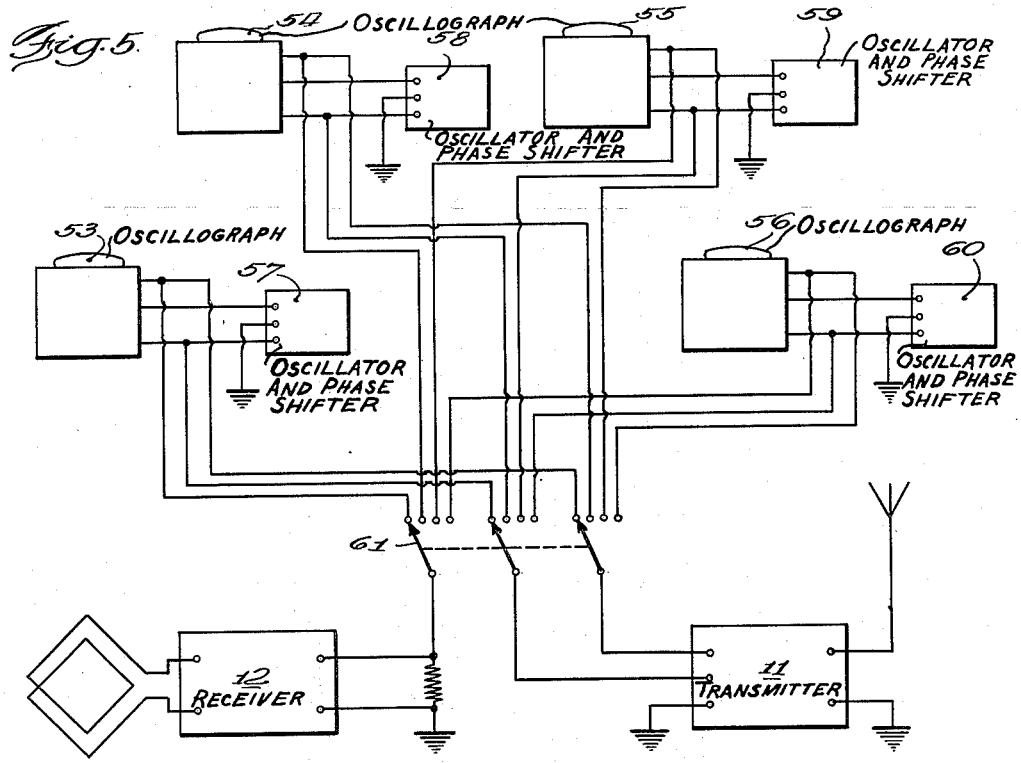
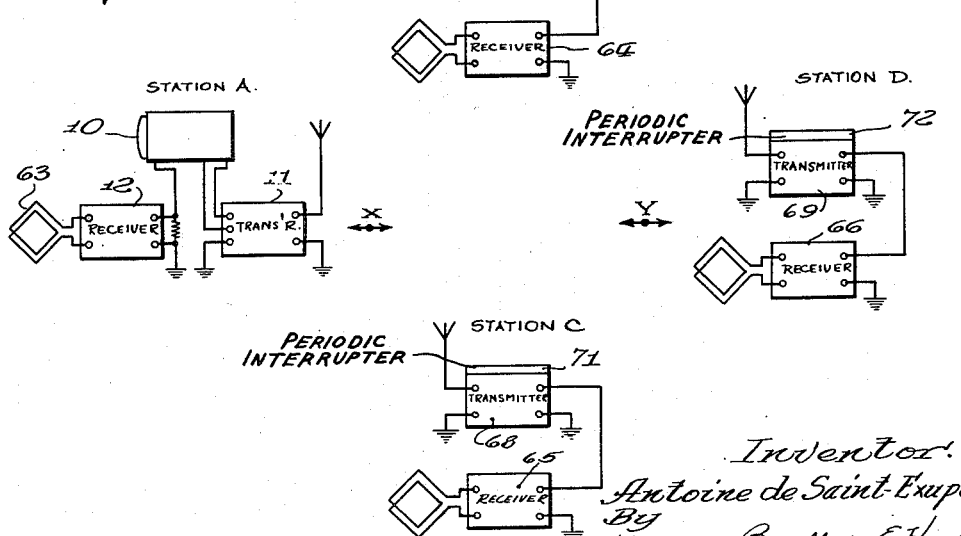
Inventor:
Antoine de Saint-Exupery
By
Williams, Bradbury & Hinkle
Attys.

Patented Jan. 2, 1951

2,536,728

UNITED STATES PATENT OFFICE 2,536,728

SYSTEM OF POSITION FINDING BY ELECTROMAGNETIC WAVES

Antoine de Saint-Exupéry, New York, N. Y.; vested in the Attorney General of the United States Application June 4, 1941, Serial No. 396,530
In France February 19, 1940

Section 1, Public Law 690, August 8, 1946
Patent expires February 19, 1960

12 Claims. (Cl. 343—11)

The present invention relates to new and improved methods of and apparatus for locating the site of an unknown position relative to one or more fixed points, the locations of which are known.

The invention is based on the retransmission, from the fixed base point or points, of suitable signals transmitted from the unknown position, and observing at the latter position the registration of the retransmitted signals as upon a suitably energized cathode ray tube or oscillograph.

One of the objects of the present invention is to provide new and improved methods of and apparatus for determining the distance between an unknown position and one or more fixed base points, the locations of which are known.

Another object of the invention is to provide new and improved methods of and apparatus for determining the bearing of an unknown position relative to one or more fixed points, the locations of which are known.

A further object of the present invention is to provide a new and improved method of navigation when in communication with either one or two fixed base points.

Another object of the invention is to provide new and improved methods of and apparatus for navigating along a given route, for approaching a landing field, and for determining the location of a point in space relative to two or more fixed base points which are spaced apart at known locations.

Other objects and advantages of the invention will become apparent from the ensuing description, in the course of which reference is had to the accompanying drawings, in which:

Fig. 1 is a diagrammatic representation of the apparatus located on a vessel, for instance, an aerial or naval vessel, or the like, whose unknown position is to be ascertained.

Fig. 2 is a front elevational view of the cathode ray tube forming part of the apparatus illustrated in Fig. 1 and showing the cathode ray trace formed on the screen thereof when the apparatus is used in accordance with one of the methods of the present invention;

Figs. 3 and 4 are views similar to Figs. 1 and 2, respectively, another embodiment of the apparatus and a trace obtainable by its use;

Fig. 5 is another view similar to Fig. 1 of a further embodiment of the apparatus located at an unknown position; and Fig. 6 is a diagrammatic representation of an embodiment involving apparatus at the unknown position and at a plurality of fixed base points.

In Figure 1 is illustrated diagrammatically a form of apparatus constituting station A, carried on the airplane, boat, or the like, whose position relative to certain fixed stations is to be ascertained or determined. In the following description it is assumed that the apparatus at station A is located on an airplane.

The apparatus consists, in the main, of a cathode ray tube 10, a radio transmitter 11, a radio receiver 12, and a plurality of oscillators and phase shifters 13 to 16, inclusive. The antenna 63 of the receiver may be either fixed or rotated for purposes described hereinafter. While a plurality of oscillators and phase shifters are shown, only one of these is utilized at any one time, and, as a matter of fact, most of the methods of this invention may be practiced with apparatus including but one.

The cathode ray tube is provided with the usual pairs of rectangular deflector plates 17 and 18. These are supplied with two sinusoidal currents of equal intensity and frequency but displaced 90° in phase, thereby to cause the cathode ray beam to describe a cone, the trace of which is a circle on the fluorescent screen of the tube. Inasmuch as the rotation is not mechanical in nature, it may be as rapid as desired. For instance, the rotational velocity of the radius vector of the circle may be 1,000 revolutions per second, or as low as 41⅔ cycles per second and as high as 10,000 cycles per second. The currents are selectively supplied to the deflector plates from the phase shifters and oscillators by means of a selector switch comprising the two simultaneously movable blades 19. One of these blades is connected by a conductor 20 to one of the deflector plates 17, the other plate 17 being grounded, and the other of the switch blade is connected by a conductor 21 to one of deflector plates 18, the other plate 18 being grounded. In the indicated position of the selector switch shown in Figure 1, the deflector plates are connected to oscillator 15, supplying a current having a frequency of 1,000 cycles per second. When the switch blades 19 are in their uppermost or first position, the deflector plates are connected to oscillator and phase shifter 13, supplying a current having a frequency of 41⅔ cycles per second. In the second position of the switch, the deflector plates are connected to oscillator and phase shifter 14, supplying a current having a frequency of 416⅔ cycles per second; and in the fourth or lowermost position of the switch, the plates are connected to oscillator and phase shifter 16 supplying a current having a frequency of 10,000 cycles per second.

The oscillators and phase shifters are of identical construction except for the use of proper circuit elements to give the necessary frequencies. Oscillator and phase shifter 13 is the only one illustrated, and comprises a tube 22 and the mutually coupled coils 23, 24 and 25. Coil 23 is shunted by a condenser 26, these two elements being chosen to give the desired frequency, in accordance with well-known practice. Coil 25, which may be termed an "output" coil, is shunted by a resistor 27 and a condenser 28 connected in series and having their junction point grounded by conductor 29, thereby to provide the deflector plates 17 and 18 with currents that are displaced 90° from each other.

The cathode ray tube includes the usual anode 31, indirectly heated cathode 32, screen 33, and grid 34. These are supplied with proper potentials from a suitable source (not shown) through conductors 35 and a potentiometer indicated generally by reference character 36. In order to provide for observing the appearance of a phenomenon having the same period as the rotation of the radius vector but of undetermined phase, various methods may be used. For instance, it is possible to cause the current feeding the cathode ray tube deflectors to be modulated by the phenomenon. It is possible also to feed a system of two concentric rings with a current which is a function of the intensity of the phenomenon, the concentric deflecting rings being positioned above the deflectors and so located with respect thereto that the cone described by the radius vector may pass and clear the rings. The current passing through the rings will effect an exclusively radial variation of the point of impact of the cathode rays on the screen without any variation of the polar angle at that moment (a cathode tube of this kind having, in particular, been suggested by Von Ardenne).

It is obvious that, if the phenomenon is a constant phase pulse, it will make itself manifest on the fluorescent screen by the appearance of a stationary tooth.

The cathode ray tube 10 of the embodiment illustrated in Fig. 1 is provided with two concentric rings 37 and 38. The concentric ring 38 is supplied with periodic pulses from the transmitter 11 through a conductor 39. It is also supplied with pulses retransmitted from one of the fixed base point stations, to which further reference will be had shortly, by means of the receiver 12, the rectified output of which is connected to the ring by conductor 40. A synchronizing signal is supplied from the oscillator and phase shifter to the transmitter through a conductor 41.

Figure 2 shows diagrammatically how the circular trace of the cathode ray becomes modified to produce stationary teeth. A first tooth, indicated by reference character 42, is produced when the transmitter sends out a pulse, this tooth resulting from the supply of current to the deflecting rings through conductor 39. A second tooth, indicated by reference character 43, is produced when the retransmitted pulse is picked up by receiver 12 and a current proportional thereto is supplied to the deflector rings through the conductor 40. The angular distance between the teeth 42 and 43 indicates, as will be explained more fully hereinafter, the distance between the unknown position and a fixed base point. The distance between the unknown position and a second fixed base point is indicated by the third tooth 44, shown by dotted lines.

The signal pulse can also be employed for the purpose of changing the intensity of the cathode ray instead of causing its deviation. If, for instance, the intensity of the cathode ray be brought to zero or to the neighborhood of zero, the pulse will result in an interruption of the continuous line of the circle traced by the cathode ray. An arrangement of this nature is illustrated in Fig. 3. Upon reference to this figure it may be noted that the apparatus corresponds, for the most part, with that of Fig. 1. The principal difference is that the control grid 34 is controlled by current impulses indicating the time at which the impulse is sent out by the transmitter and the time at which the retransmitted impulse is received by the receiver. The impulse from the transmitter is applied to grid 34 through conductor 46, while the impulse from the receiver is applied through conductor 47. These conductors are connected to the grid through a condenser 48. The grid is connected to the potentiometer 36 through a resistor 49, and the grid potential is so adjusted that when the pulses corresponding to transmission and reception of the signal pulse are applied to the grid through condenser 48, the intensity of the cathode ray is brought to the neighborhood of zero, thereby resulting in an interruption of the trace, as illustrated in Fig. 4 at 51 and 52, respectively. If desired, the cathode ray tube control could be so arranged that the pulses result in increasing the intensity of the cathode ray so as to produce luminous spots.

It should be understood, however, that the invention is not limited to the use of cathode ray oscillographs giving circular traces. It can also be put into effect with any trace which makes it possible to locate the moment of transmission of the starting pulse within a constant time interval serving as a basis for the moment of appearance of the corresponding return pulse.

Furthermore, the invention is not limited to the use of a single cathode ray oscillograph used in conjunction with either a single or a plurality of oscillators and phase shifters. It is possible to utilize an equal number of cathode ray tubes and oscillators and phase shifters, whereby different oscillographs are utilized, depending on the frequency selected. An arrangement of this type is illustrated in Fig. 5, to which reference is now had.

The apparatus illustrated in Figure 5 may be seen to include four cathode ray oscillographs, indicated by reference characters 53 to 56, inclusive. These may correspond in construction with the cathode ray oscillograph 10 of Fig. 1. They are connected to individual oscillators and phase shifters 57 to 60, inclusive, corresponding to those indicated by reference characters 13 to 16, inclusive, in Fig. 1. The cathode ray oscillators and phase shifters are each connected by three conductors corresponding to conductors 39, 40 and 41 of Fig. 1, to a selector switch 61, whereby the conductors individual to each oscillator and phase shifter may be connected to the transmitter 11 and receiver 12. In the indicated position of the selector switch, oscillograph 53 and oscillator and phase shifter 57 are operatively connected to the transmitter and receiver, and in the other positions, selected ones of the others so connected. Further description of this particular embodiment is not deemed necessary, in view of its similarity to the apparatus described hereinabove.

The apparatus at the fixed base points or stations B, C, and D includes receivers 64, 65, and 66, and transmitters 67, 68, and 69, respectively.

In order that station A may distinguish between the various stations B, C, and D, the stations are provided with suitable means for periodically interrupting or modulating the transmission of the stations a certain number of times per minute according to characteristic signals, such as code. Thus, the tooth corresponding to the retransmitted signal formed on the oscillograph at station A will beat its own identifying signal. Such means at the various stations are indicated by block diagrams 70, 71, and 72, respectively.

In a system comprising station A and a single fixed base point station, such, for instance, as station B, both stations may transmit on any wave length whatever, that is, both stations may transmit either on the same wave length or at different wavelengths. However, when a plurality of base points or retransmitting stations, such as B, C, D, are used, it is preferable that all of the stations B, C, D, be permanently tuned for reception to a common wavelength $\lambda 1$, being that which is transmitted by the transmitter 11 of the station A, and that the stations B, C, D, be tuned to retransmit on a common wavelength $\lambda 2$. This makes it possible to avoid any operational adjustment on the moving object on which station A is located, such as an airplane, whose set is permanently synchronized with the stations. The teeth and other reference marks, corresponding respectviely to stations B, C and D will appear simultaneously on the screen, but will coincide only in the particular case of a distance $AB=AC$. The use of different wave lengths $\lambda 1$ and $\lambda 2$ avoids the possibility also of any station C retransmitting, in addition to the pulses from A, retransmissions of the same pulses by the other stations B, D, which would give rise to an infinite number of reflected teeth.

In operation, the radio transmitting station A transmits a pulse of given frequency. The frequency is determined by the period of time it takes the cathode ray of the oscillograph to describe its complete trace, and the pulses are transmitted at the moment when the cathode ray passes over a given point of its trace as the beginning of the phases. The station B receives, and after detection, amplification and modulation, retransmits the pulses it receives. The retransmitted pulse is received at station A and directed to the control system of the cathode ray oscillograph. The result is interpreted on the screen of tube 10 at station A by a discontinuity of the trace, that is, in the case of apparatus corresponding to that of Figure 1, the discontinuity is in the form of a tooth; in the case of the apparatus of Figure 3, a dark interval; and also in the case of the apparatus of Figure 3, the discontinuity may be in the form of a more brilliant spot.

The interval between the initial point of discontinuity and that resulting from the reception of the retransmitted signal thus measures an interval of time. This interval of time includes a period of delay inherent in the operation of stations A and B, which is a fixed period of time, and the variable time required, for the initial transmission and reception of the transmitted pulse. If the distance from A to B is 10 kilometers, for example, the interval corresponds to a period of travel of $1/15{,}000$ of a second measured, in the case of the circular trace, by $1/15$ of the distance around the circle or a lag of $24°$, assuming that the rotation of the radius vector is 1,000 revolutions per second.

Consequently, by observing the positions of the teeth or other marks produced on the screen by retransmission by station B, the distance between stations A and B can be deduced. By similarly observing on the screen the actions of marks characteristic of station C, the position of which is fixed like that of B, the position of station A relative to stations B and C can be deduced from the two observations by conventional means.

As already pointed out, the different stations B, C, and D can be arranged so that their transmission is interrupted periodically a certain number of times per minute according to characteristic signals such as code. In this way the observer at station A can readily identify the tooth or other marks on the screen as produced by a particular station.

From the foregoing it is evident that the present invention provides an arrangement such that:

(1) The distances from the station A to the fixed points B, C, D . . . can be read immediately and without adjustment.

(2) The operation is not liable to being jammed because no periodic signal transmitted on the wave length of A will appear on the observation screen unless it is exactly synchronized for the transmission frequency of the pulses. Indeed, a lag of one revolution in three hundred and sixty thousand revolutions would become apparent on the viewing screen, assuming the rotational velocity of the cathode ray is one thousand revolutions per second, by reason of a rotation of the parasite tooth of one degree per second.

If several transmitters such as A are to function simultaneously (as in the case of aircraft flying in formation) mutual jamming can be avoided by providing each of them with a characteristic frequency of signal transmission (frequency of the pulses).

(3) In contradistinction to certain other devices, the device of the invention will give indications only so long as the indications have significance.

The accuracy of the measurements of the device of the invention is a function of the factors of precision of measurement of a distance by an electromagnetic wave and of the stability of the time delay in the retransmission of the pulse-energy through the stations involved, which are substantially absolute.

The accuracy of the readings being dependent only on a minimum duration of the pulses consistent with the energy to be transmitted, it would appear that distances can be determined to within a hundred meters or so.

The invention makes it possible to determine not only the distance to the reference point B, but also the bearing of B relative to A. According to a first method, the receiving aerial at station A is of the directional and rotatable type, a loop aerial, for instance. By rotating the loop aerial, the disappearance or maximum flattening out of a given tooth corresponding to station B will be obtained, and this will give the bearing of station B. The distance to B from A is deduced from the angular position on the screen of the corresponding tooth. In this case a single retransmitting station is sufficient to determine the location of point A.

When point A represents a moving object, an aircraft, for instance, its directional receiving aerial can, according to the invention, be immovable on the moving object. The moving object will then have to be orientated as a whole in order to determine the azimuth of point B. This arrangement is particularly convenient owing to the fact that it reduces the operation of correcting course to a simple navigational maneuver, thereby considerably facilitating the navigation of the aircraft when the duty of navigating and piloting is assumed by the pilot alone.

The invention includes another method of determining the azimuth of reference point B by a simple piloting maneuver, without the necessity of employing any directional receiving aerial. The spacing of the tooth which indicates the distance to point B varies according to the distance between A and B. In other words, the tooth moves in proportion as A comes nearer to B, and faster in proportion as the rotative or translative velocity of the cathode ray is greater. A simple calculation shows, for instance, that for a speed of 1,000 rotations per second of the cathode ray the tooth, of the circular trace, rotates at the rate of about 2.4 degrees in 10 seconds for a variation of one kilometer in the distance AB in a corresponding period of time, which corresponds to the speed of an aircraft traveling at 360 kilometers per hour. If the speed of the cathode trace was 10,000 revolutions per second, then the tooth would rotate at the rate of 24 degrees under the same conditions. According to the invention, the determination of the bearing is effected by the immobilization of the tooth on the oscillograph screen by a momentary variation of the path of flight of the aircraft. The course which procures said immobilization forms an angle of 90° with the bearing of point B.

From the foregoing it will be seen that it is desirable to have definite frequencies determining the rate of travel of the indicating trace on the screen. Four frequencies are obtainable with the embodiments of the invention described above. A lesser number can be used if desired, and as a matter of fact, three frequencies, such as the frequencies of 41⅔, 416⅔, and 10,000 revolutions per second are sufficient. The lowest frequency of 41⅔ revolutions per second is intended for long distance navigation. The tooth, assuming a circular trace, then moves 360° for 3600 kilometers. The second mentioned frequency, namely, that of 416⅔ revolutions per second, is intended for more accurate navigation and the tooth moves 360° for 360 kilometers. The third mentioned frequency, namely, that of 10,000 revolutions per second, is intended to enable solution of problems involving the highest possible sensitivity of differential measurements. In the last case, the cathode ray rotates at a miximum speed consistent with technique or at about 10,000 revolutions per second for an angular displacement of 1° for 41⅔ meters.

The present invention enables carrying out various navigational methods other than those described above.

One method concerns navigation with the help of any two stations of a network of fixed stations B, C, and D.

The distances to the two fixed points being known, the position of station A can be deduced directly by the intersection of two circles where short distances are concerned. If long distances are involved, the method used is that of ordinary celestial navigation, wherein the fixed stations represent fixed heavenly bodies, and the distances read on the screen represent the radii of the circles of height, and wherein resolution of spherical triangles is merely a question of elementary graphs. This method which is applicable not only to aviation, but also to maritime navigation, is not subject either to visibility of actual heavenly bodies, or to the lack of precision, which increases in proportion to the distance involved, of goniometrical bearings.

Another method relates to navigation by means of a single fixed station B, and eliminates need for manipulation of a directional aerial.

It has already been described herein how to obtain the bearing of a single station B, and the angle and distance defining the position of station A. But, in cases where the pilot is flying alone, it is difficult for him to manipulate a directional aerial. The oscillograph being set to operate on the highest frequency of 10,000 revolutions per second, the tooth of the resultant trace on the screen will be subject to appreciable displacement if the pilot navigates in the direction of station B. It will become stationary (momentarily) in the perpendicular direction. By making simple turns, the pilot will seek for the course which renders the tooth stationary. The bearing is, obviously, at right angles to said course. (The indetermination is removed by the direction of the variation in the distance to station B.)

A third method relates to navigation along a given course.

Certain countries, the United States for instance, prefer navigational methods which fix the pilot on his course, the sole object of this being to keep him advised as to his position. Now, in addition to position, the present device makes it possible to define the route or course itself with more accuracy and convenience than by such methods.

For illustration, let XY be the course, and B and C the positions of two fixed retransmitting stations symmetrically located relative to said course. For greater convenience it is provided that said stations shall operate with complementary identification signals, such as the Morse code letters $a$ and $n$.

So long as moving station A travels along route XY, and therefore at equal distances from the two fixed stations, the teeth corresponding to the retransmissions of stations B and C will be superimposed on the screen and the new tooth thus formed will no longer pulsate since $a$ and $n$ are complementary. In this way immediate warning will be available of any failure of one of the stations B and C by the appearance of pulsations, so that there is no risk of relying on the presence of a single tooth after it has lost its significance due to failure of one of the fixed stations.

Whenever the aircraft deviates from its course, the two teeth move apart and the phenomenon will be rendered still more conspicuous by the appearance of pulsations.

If, once the aircraft has been set on its course, the highest frequency of 10,000 revolutions per second be introduced, the very slightest deviation will be perceptible whereas, according to present methods, the minimum deviation capable of warning the navigator may amount to some kilometers when midway along a marked out route.

In addition, it will always be possible to ascertain the mileage covered along the route (hence the speed) either by deducing it from distances B or C, or by the reading of a third tooth issuing from an axially located station.

A fourth method relates to guiding an airplane toward a landing field.

If a landing field be defined by fixed stations B and C located on either side of the landing strip, and if XY represents the line of approach perpendicular to base BC at its middle and if, on the plane's nearing the landing field the highest frequency of 10,000 revolutions per second is introduced to render perceptible small variations in distance, course XY can be followed by navigating with the teeth superimposed. Warning of passing the beginning of the landing strip will be given when the teeth pass through a minimum on the trace corresponding to ½ BC. The reading of minimum lacking precision, an axially located station may be employed also.

The last described method can be used for guiding an airplane in landing on an airfield.

In this case the moving station A is not far distant from the fixed stations B and C, so that instead of installing retransmission stations at B and C, the reflective effect of the waves transmitted by A on conductors or metallic masses positioned at B and C may be utilized.

Control of the correct location of A along axis XY perpendicular to the center of segment B, C is obtained by maintaining coincidence, on the trace, of the teeth corresponding to the reflections by B and C of the pulses transmitted by A. Any deviation of A relative to XY will cause separation of the teeth. The passing of A in front of the line B, C will appear as a minimum or minor divergence or separation of the reflected teeth.

The last described arrangement can be combined with the use of an axial reference station, acting as a retransmitter or merely as a reflector, for measuring the distance along the landing axis.

A fifth method provides for guiding such as an airplane along a selected course toward a target for such as aerial bombing operations.

The objective or target is flanked by two suitably located retransmitting stations B and C placed equidistant from the objective, so that coincidence of the teeth produced by the two stations and a reading of the distance BA will place the airplane relative to the target. The method of approach to the target then consists in navigating the airplane with the teeth joined along XY as in the fourth described method, until the reading of the distance from the target is obtained.

But, as the course followed is not BA but one perpendicular from the center of B, C, the distance read along BA is not suitable for the rapid computation of the speed of approach to the target. The use of a third axial station D will facilitate the last.

If the highest frequency be used when in proximity to the target, a study of the movement of tooth D will permit not only observing with precision the moment of flying over the target, but also anticipating said moment with increasing accuracy, which will make it possible to determine the parameters of virtual bombing aim.

Errors made in dead-reckoning of the position of moving station A will not increase in proportion with the distance from the target, and if the dimension of base BC has been chosen sufficiently large the sighting error will be negligible.

Here again, the accuracy of the method depends only on the stability of inertia of the radio stations and on the separating power of the highest frequency.

It will be understood that the invention permits of numerous variants in construction and methods of use within the scope of the invention.

Having described my invention, what I claim as new and useful and desire to secure by United States Letters Patent is:

1. A system of position-finding and navigating by means of electromagnetic waves, including in combination, means including a cathode ray tube and its beam for periodically describing the same path to define a continuous trace and located at a point it is desired to orientate, means for transmitting pulses from said point by electromagnetic waves, means at a pair of spaced apart points serving as reference bases for receiving and retransmitting said pulses, means at said base points for interrupting the retransmission of the pulses in a manner to define complementary code signals, and means for receiving the retransmitted pulses at said first point in a manner to modify said beam to produce discontinuities in said trace, whereby said discontinuities merge as long as the body remains on a course equidistant from the two base points and move apart when the body departs from said course.

2. A method of navigating a moving body along a fixed course, which includes rotating an electron beam on said body in a manner to produce a continuous trace, periodically transmitting impulses from said body by means of electromagnetic waves in a manner to produce a first discontinuity in said trace in synchronism with the pulse, receiving the pulses at fixed bases of known location on opposite sides of the course, retransmitting the pulses from the bases, interrupting the retransmission of the pulses in a manner to define complementary code signals identifying the individual bases, and receiving the retransmitted and interrupted pulses at said body in a manner to produce discontinuities in said trace corresponding in number to the bases and beating according to the code signals imposed thereon, whereby merging of the discontinuities obtains while the moving body remains on the said course and the beats of the discontinuities nullify each other and said discontinuities move apart when said body departs from the course and become identifiable.

3. A method according to claim 2 wherein the impulses transmitted from the moving body are received by another fixed base located on the course and retransmitted to produce a further discontinuity of said trace which is angularly spaced from one of the other discontinuities in said trace while the moving body is still distant from the last mentioned base, whereby the distance of the moving body from said last mentioned base can be computed from the angular displacement of the related discontinuities.

4. A method according to claim 2 wherein close approach of the merged discontinuities together toward said first discontinuity is achieved by arrival of said body along the fixed course at a predetermined destination on said course.

5. A system of position-finding and navigating by means of electromagnetic waves, including in combination, means comprising a plurality of cathode ray tubes having beams arranged for periodically describing the same traces at different frequencies and located at a point it is desired to orientate, means for transmitting from said point a brief signal by means of electromagnetic waves of one frequency, means including a direct connection between said transmitting means and the cathode ray tubes for creating a first discontinuity in their traces when said signal is transmitted, means at another point serving as a reference base for receiving and retransmitting said signal at a second frequency, means at the first mentioned point for receiving said retransmitted signal, and means including a direct connection between said receiving means and any of said cathode ray tubes at said first mentioned point controlling said beams in response to said retransmitted signal for creating a second discontinuity in said traces.

6. In a radio orienting device for an airplane or other moving body, said device being of the type involving a transmitter-receiver and an oscilloscope on the airplane, said transmitter being energized to emit pulses intermittently, said oscilloscope comprising a cathode ray tube, means energizing the same to produce a continuous cathode ray trace of circular form on a target, said cathode ray tube having opposed pairs of deflector plates energized from the transmitter and receiver respectively, and at least two fixed distant stations each having a receiver-transmitter for receiving and retransmitting the pulses emitted from the transmitter on the airplane; characterized by the fact that the cathode ray tube is provided with ray deflecting means consisting of conducting rings surrounding the cathode ray tube between the deflecting plates and target and in axially spaced positions and energized from the transmitter and receiver respectively in such manner that a first visible discontinuity is produced in the trace when the airplane transmitter emits a pulse, and second and third discontinuities are produced in the trace, angularly spaced from each other and from the first trace in accordance with the distances and the direction of the airplane from the fixed stations as the pulse retransmitted from the fixed stations reach the airplane receiver.

7. In a radio orientating device for an airplane or other moving body, said device being of the type involving a transmitter-receiver and an oscilloscope on the airplane, said transmitter being energized to emit pulses intermittently, said oscilloscope comprising a cathode ray tube, means energizing the same to produce a continuous cathode ray trace of circular form, said cathode ray tube having opposed pairs of deflector plates energized from the transmitter and receiver respectively, and at least two fixed distant stations each having a receiver-transmitter for receiving and retransmitting the pulses emitted from the transmitter on the airplane; characterized by the fact that the cathode ray tube is provided with ray deflecting means energized from the transmitter and receiver respectively in such manner that a first visible discontinuity is produced in the trace when the airplane transmitter emits a pulse, and second and third discontinuities are produced in the trace, angularly spaced from each other and from the first trace in accordance with the distances and the direction of the airplane from the fixed stations as the pulses retransmitted from the fixed stations reach the airplane receiver, and further characterized by the fact that the transmitters of the fixed stations are provided with means operating to interrupt the retransmission of the pulses in a different manner at each such station so as to produce identifying visible beats in the corresponding visible discontinuities of the cathode ray tube trace.

8. An orientating device according to claim 7 wherein the means operating to interrupt the retransmission of the pulses at at least two of said fixed stations produce interruptions at one station concurrent with transmission at another station whereby such interruptions are not indicated when the airplane is equidistant from both stations and said beats are fully visible and identifiable when the airplane is not equidistant from said stations.

9. A direction and distance finding equipment comprising a radio pulse generating and transmitting arrangement, a manually rotatable wave directive collector, a pulse receiving arrangement coupled with said collector for receiving pulses which are reflected back from obstacles situated within the field of said pulse transmitter, an oscillograph indicator, means synchronized with the pulses of said transmitter for controlling the sweep of said indicator, means for applying said received pulses to said indicator to provide, in cooperation with said sweep, simultaneous indications of the distances of said obstacles on said indicator and means for obtaining a supplementary indication of direction on said distance indicator itself by adjustment of said wave collector to a position of zero reception.

10. A direction and distance finding equipment comprising a radio pulse generating and transmitting arrangement, a rotatable wave directive collector, a pulse receiving arrangement coupled with said collector for receiving pulses which are reflected back from obstacles situated within the field of said pulse transmitter, an oscillograph indicator, means synchronized with the pulses of said transmitter for controlling the sweep of the indicator and means for applying said received pulses to said indicator to provide, in cooperation with said sweep, simultaneous indications of the distances of said obstacles on said indicator and to obtain an indication of direction by adjustment of said wave collector to a position of zero reception as shown on said indicator.

11. A direction and distance finding equipment comprising a radio pulse generating and transmitting arrangement, a manually rotatable wave directive collector, a pulse receiving arrangement coupled with said collector for receiving pulses which are reflected back from obstacles situated within the field of said pulse transmitter, an oscillograph indicator comprising a fluorescent screen means for producing a cathode ray and sweep producing means for causing said ray to describe a continuous trace on said screen, means synchronized with the pulses of said transmitter for controlling the sweep of said indicator, means for applying said received pulses to said indicator to produce discontinuities in said trace to provide simultaneous indications of the distances of said obstacles, and means for obtaining a supplementary indication of direction on said indicator itself by adjustment of said wave collector to a position of zero reception.

12. A direction and distance finding equipment comprising a radio pulse generating and transmitting arrangement, a rotatable wave directive collector, a pulse receiving arrangement coupled with said collector for receiving pulses which are reflected back from obstacles situated within the field of said pulse transmitter, an oscillograph indicator comprising a fluorescent screen, means for producing a cathode ray and sweep producing means for causing said ray to describe a continuous trace on said screen, means synchronized with the pulses of the transmitter for controlling the sweep of the indicator and means for applying said received impulses to said indicator to produce discontinuities of said trace to provide simultaneous indications of the distances of said obstacles and to obtain an indication of direction by an adjustment of said wave collector to a position of zero reception as shown on said indicator.

ANTOINE DE SAINT-EXUPÉRY.

REFERENCES CITED

The following references are of record in the file of this patent:

UNITED STATES PATENTS

| Number | Name | Date |
|---|---|---|
| 1,965,632 | Ewald | July 10, 1934 |
| 1,979,225 | Hart | Oct. 30, 1934 |
| 2,074,408 | Lowell | Mar. 23, 1937 |
| 2,134,716 | Gunn | Nov. 1, 1938 |
| 2,143,035 | Smith | Jan. 10, 1939 |
| 2,225,046 | Hunter | Dec. 17, 1940 |
| 2,226,929 | Hefele | Dec. 31, 1940 |
| 2,227,598 | Lyman et al. | Jan. 7, 1941 |
| 2,248,215 | Budenbom | July 8, 1941 |
| 2,255,659 | Gage | Sept. 9, 1941 |
| 2,301,929 | Budenbom | Nov. 17, 1942 |
| 2,405,239 | Seeley | Aug. 6, 1946 |